United States Patent [19]

Martin

[11] 4,122,448

[45] Oct. 24, 1978

[54] AUTOMATIC PHASE AND GAIN BALANCE CONTROLLER FOR A BASEBAND PROCESSOR

[75] Inventor: Raymond G. Martin, Ellicott City, Md.

[73] Assignee: Westinghouse Electric Corp., Pittsburgh, Pa.

[21] Appl. No.: 817,759

[22] Filed: Jul. 21, 1977

[51] Int. Cl.² .......................... G01S 9/42; H03G 5/16
[52] U.S. Cl. ........................................ 343/7.7; 330/52
[58] Field of Search ............................ 343/7.7; 330/52

[56] References Cited

U.S. PATENT DOCUMENTS

| 3,599,208 | 8/1971 | Nelson | 343/7 A |
| 3,781,703 | 12/1973 | Duty | 330/52 |
| 3,794,998 | 2/1974 | Pearson, Jr. et al. | 343/16 M |

Primary Examiner—Maynard R. Wilbur
Assistant Examiner—Richard E. Berger
Attorney, Agent, or Firm—W. E. Zitelli

[57] ABSTRACT

An automatic phase and gain balance controller is incorporated in a typical baseband processor of a MTI radar system employing doppler processing techniques to effect balancing adjustments in the in-phase (I) and quadrature (Q) signal generation channels for substantially eliminating spurious image frequency component formations which may result from any unbalance therein. More specifically, the automatic controller provides two substantially non-interactive servo control loops to maintain balance between the I and Q signal generation channels by performing balancing adjustments on two adjustment parameters, namely phase and amplitude. Phase and amplitude imbalance errors between the I and Q channel are obtained in response to a pilot signal which is injected into the baseband processor of the MTI radar receiver, preferably during the dead times of the interpulse periods of pulsed reception. Accordingly these phase and amplitude imbalance errors are sensed and separately isolated by the automatic controller and each sensed error is used to control the servo control loop respectively associated therewith.

22 Claims, 13 Drawing Figures

AUTOMATIC PHASE AND GAIN BALANCE CONTROLLER FOR A BASEBAND PROCESSOR

BACKGROUND OF THE INVENTION

1. Field of the Invention

The present invention relates to baseband processors in general, and more particularly, to an automatic phase and gain balance controller for separately sensing phase and magnitude errors representative of the unbalance in the baseband processor channels which generate the inphase and quadrature components and nulling these sensed errors by providing balancing adjustments in the channels.

2. Description of the Prior Art

Typically, a baseband processor is utilized by a radar system for the detection of a moving target using doppler processing techniques. Basically, a moving target indicator (MTI) type radar system transmits a series of fixed or variably spaced constant frequency pulses to a target. The pulsed radar signals are reflected from the target(s) and are detected by the radar system which is capable of sampling the detected echo signals at predetermined time intervals after transmissions, more commonly referred to as range cells. The distance or range of the target from the radar system is generally determined as a function of the time required for the propagated pulsed signals to travel to and to be reflected from the target. Subsequent to a transmitted pulse and prior to the next transmitted pulse, that is within the interpulse period, there typically exists a period of time in excess of the time corresponding to the maximum instrumented range of the radar system. This time period is normally referred to as dead time due to the ineffective operating state of the radar system.

Basic to the operation of the doppler processor of the MTI radar system is the variation or shift in frequency imparted to the return echo signals from the moving target. This doppler shift, which is usually measured in the frequency domain by noting the location of the spectral response peak, is used to determine the velocity of a specified target. Normally, the echo signals comprise both desired echo signals from relatively fast-moving targets and unwanted clutter echo signals from relatively slow-moving or stationary objects such as buildings, low-elevation objects, rain and the like which are within the specified range cell of the target.

In a typical MTI radar system employing a coherent radar receivier, a constant transmission frequency is generally derived from a coherent master oscillator, which synchronizes the operation of the radar receiver, and is transmitted in pulse bursts of approximately 0.5 microseconds at intervals generally spaced at around a millisecond. The echo signals are normally conditioned by a conventional RF amplifier and then mixed with a reference frequency also derived from the coherent master oscillator (COHO) to obtain an IF signal generally centered at 30 megahertz wherein the echo signal information remains intact. In most radar applications, it is important to discriminate between wanted targets and unwanted clutter not only on the basis of the speed of a moving object, but also on its direction and relation to the radar system.

Present MTI radar systems employ baseband processors to generate both an in-phase signal and quadrature signal from the IF signal containing the echo signal information to derive both the speed and direction of the moving object. A baseband processor is shown typically in FIG. 1 wherein the IF signal 1 is an input to two synchronous detectors 2 and 3. A reference frequency 4 generally of the same frequency and phase as the center frequency of the IF signal 1 is derived from the COHO 5 and conducted unaltered in phase to the synchronous detector 2, wherein a conventional mixing operation is performed yielding sum and difference frequency components of the signals 1 and 4. A low pass filter (LPF) 6 filters out the sum frequency components of the output signal of the synchronous detector 2 to provide only inphase signal frequencies which are within a narrow band from zero to approximately 2 megahertz, commonly referred to as baseband. Also the reference frequency signal 4 is shifted 90° out-of-phase by a typical phase shifter 7 and the phase shifted signal 8 is provided to the synchronous detector 3 wherein a conventional mixing operation is performed to yield quadrature sum and difference signals. A quadrature sum signal is filtered by a low pass filter (LPF) 10 to yield only quadrature frequency signals with the specified baseband. These baseband frequency in-phase and quadrature analog signals may be digitized by conventional analog-to-digital (A/D) converters 11 and 12, respectively, for further digital processing by the MTI radar system, for example, wherein stationary and moving objects may be discriminated.

Synchronous detectors such as those used in the baseband processor of the radar receiver described above may be subject to phase and amplitude channel unbalance in generating the I and Q signals. In particular, this unbalance distortion may include the generation of spurious (image) frequency components in the doppler spectral response curves derived by the MTI radar system which would not be normally present using ideal synchronous detectors. In addition, the A/D converters described in connection with the baseband processor of FIG. 1 may produce an additional channel amplitude imbalance, contributing further to the signal distortion. Various manual circuit adjustments can be employed to eliminate the unbalance effects, however the practical limitations to the stability of the adjustment settings such as drift as a function of time and ambient conditions (temperature, etc.) may still cause distortion in the doppler spectral response curves which may exceed that allowable for critical conditions.

One case which illustrates the effects of the unbalanced errors of a baseband processor is manifested in an MTI radar system employing a pair of ground and rain clutter canceller filters for cancelling echo signals from ground obstacles and wind-borne rain. Each filter is designed with unsymmetrical doppler responses as depicted in FIGS. 2A and 2B. Typically, wind-borne rain interference may be detected as either being blown in a direction away from or into the antenna of the MTI radar system. One of the pair of digital canceller filters is selected to provide the necessary attenuation stopband, as defined by either frequency $+f_1$ or $-f_1$ as shown in FIGS. 2A and 2B, respectively, to suppress the rain echo signal interference corresponding to the direction in which the rain is being blown with respect to the scan of the antenna. It is apparent that the rain echo signal may resemble a moving target and may create false alarm conditions if permitted to pass further into the digital processing of the MTI radar system. However, this condition is alleviated as a result of the attenuation by the pair of filters.

Since it is typically not possible to build a very broad filter which has a wide notch in both the positive and negative doppler frequency regions concurrently, the MTI radar system appears to be vulnerable to spurious image frequency components of the rain clutter echo signals. The power spectral density of typical rain clutter is shown in FIG. 3. The MTI filter response shown in FIG. 2A would be appropriate for attenuating such unwanted rain clutter returns. However, when channel unbalance causes the generation of spurious image frequency components as discussed above and indicated in FIG. 3, it is evident that the MTI filter response shown in FIG. 2A is unable to suppress these spurious image frequency components. These image frequency components will normally fall in the passband of the MTI filter and not be attenuated as exhibited by FIGS. 2A and 3. Further, these image frequency components may resemble targets to the MTI radar system creating possible problems such as false alarms or reduction of radar system sensitivity.

Another example case of the effects of unbalance errors in a baseband processor is manifested in a radar doppler filter with a relatively narrow passband, not centered at zero frequency, and with low doppler sidelobes at the passband image frequency. With ideal phase-detector and A/D converter circuits, any signals falling in the passband image frequency range will be heavily attenuated by the low doppler sidelobes. However, synchronous detector and/or A/D converter unbalance may produce distortion components of the echo signals at their image frequencies, which will therefore fall in the doppler filter passband, producing appreciable and unusually unacceptable outputs from the filter. This effect frequently places a limit on the degree of doppler filter sidelobe attenuation which can effectively be achieved by current digital signal processing circuits.

The image frequency distortion component is usually measured in magnitude relative to the actual echo signal. A graph depicting the relative magnitude of the image frequency component measured in decibels (db) as a function of amplitude and phase errors representative of the unbalance in the I and Q signal generation channels is shown for a typical baseband processor in FIG. 4. Corresponding to the previous example, it is desirable to maintain the relative image frequency component below −35 db. Therefore, it is apparent from analyzing the graph of FIG. 4 that the baseband processor is very sensitive to these amplitude and phase errors and the image frequency components developed therefrom. It is further apparent from the foregoing discussion that it is of paramount importance to maintain adjustment in the balance between the synchronous detectors and A/D converters in the I and Q signal generation channels, thereby reducing the problems of false alarms or reduction of baseband processor sensitivity as a result of the formation of spurious image frequency component signals.

SUMMARY OF THE INVENTION

In accordance with the present invention, an automatic adjustment controller operates to null any phase and amplitude imbalance which may be present between the inphase and quadrature signal generation channels of a baseband processor which may be incorporated in a radar system employing a doppler-type processor, for example. More specifically, the automatic adjustment controller includes a pilot signal generator which is conducted to the in-phase and quadrature signal generation channels of the baseband processor, preferably during the dead time of the interpulse transmission periods of the radar system. The in-phase and quadrature signals generated from the pilot signal may include phase and amplitude error signals representative of the imbalance between the channels of the baseband processor. The automatic adjustment controller further includes a portion which senses and isolates the phase and amplitude error signals from the pilot signal in-phase and quadrature signal components. More particularly, the phase and amplitude imbalance error signals are isolated substantially independent and separate of each other. Still further included in the automatic adjustment controller are two substantially non-interactive servo controllers, one of which is governed by the separately isolated phase imbalance error signal to independently adjust for a correction in the phase imbalance between the channels and the other of which is governed by the separately isolated amplitude imbalance error signal to independently adjust for a correction in the amplitude imbalance between the channels.

DESCRIPTION OF THE PREFERRED EMBODIMENT

Figure 5:
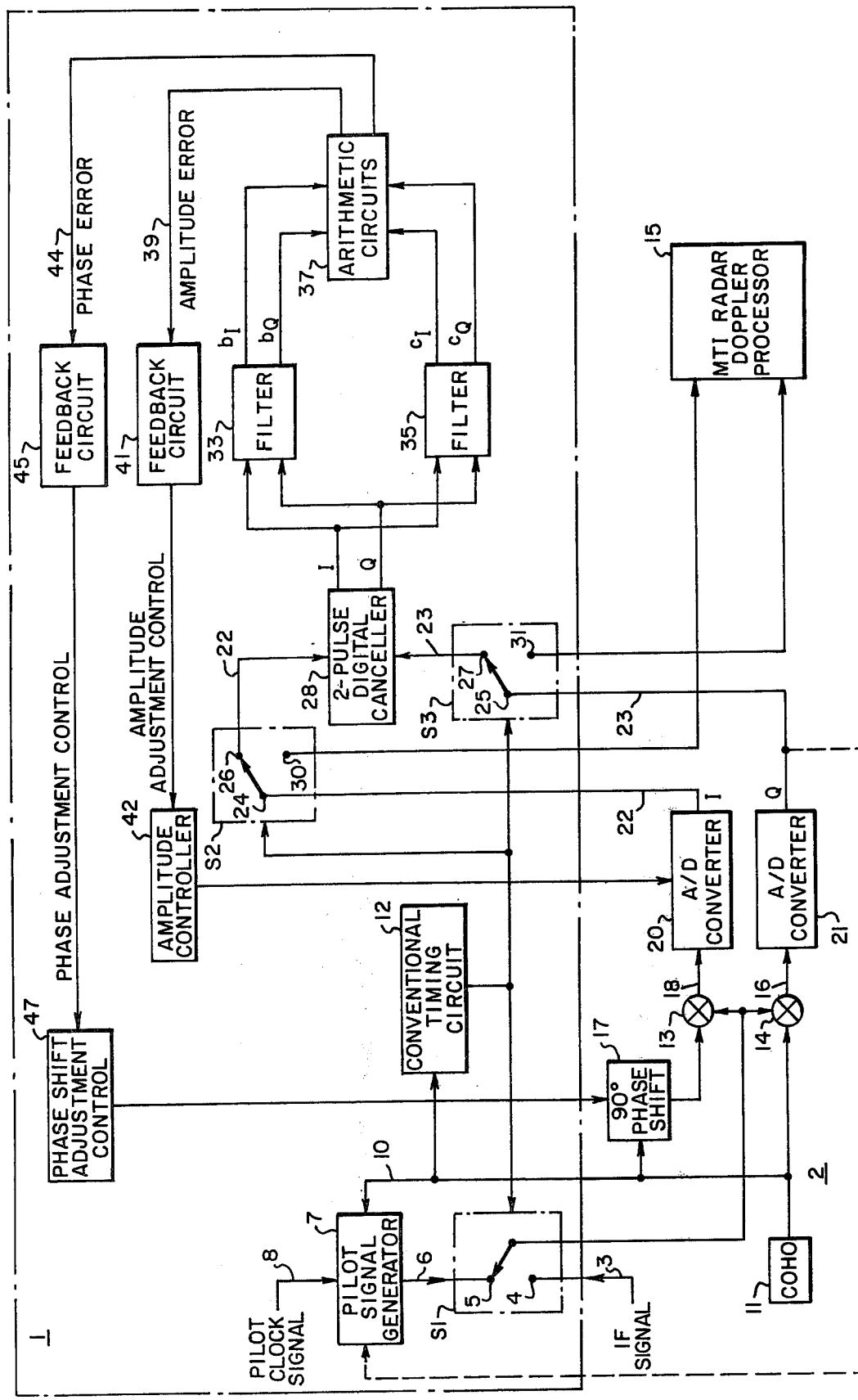
FIG. 5 is a block diagram schematic of an automatic phase and gain balance controller for a baseband processor.

Referring to FIG. 5, an automatic phase and gain balance controller 1 is coupled to the I and Q signal generation channels of a conventional baseband processor 2 employed by a radar receiver, for example. An incoming IF signal 3 containing range and velocity information of moving objects detected by the radar system is coupled to position 4 of a single-pole-double-throw switching function S1. Connected to the other position 5 of switch S1 is a pilot signal 6 generated from a pilot signal generator 7. The pilot signal generator 7 is governed by a pilot signal clock 8, which may have a frequency of typically 1000 Hz, and a signal 10 derived from the master coherent oscillator (COHO) 11 of the MTI radar receiver. The pilot signal 6 may include a modulation component of a constant amplitude having a frequency of typically 250 Hz which is used for purposes of determining any unbalance in the I and Q signal generation channels of the baseband processor 2. The switching function S1 is operated by a conventional timing circuit 12 to permit the pilot signal to be conducted to the synchronous detectors 13 and 14 for processing thereby, preferably during the dead time of the MTI radar receiver within the interpulse period of the constant-frequency pulse transmission. Reference is made herein to U.S. Pat. No. 3,797,016 issued Mar. 12, 1974; by Raymond G. Martin; and to U.S. patent application Ser. No. 792,279, filed Apr. 29, 1977, by John W. Taylor et al., for a more detailed understanding of present radar systems employing baseband processors of the type which may utilize the present invention.

The IF signal 3 is normally processed by the baseband processor 2 to produce I and Q signal components from which a conventional MTI radar receiver doppler processor 15 may discriminate between wanted echos and unwanted clutter. In this example of baseband processing, the IF signal 3 is mixed in one channel, for example the Q signal generation channel, in the synchronous detector 14 with the oscillator signal 10 to produce Q signal components 16 of the difference frequency signal which is representative of the doppler frequency shifts of the moving objects and having a first phase relationship to the oscillator signal 10. In addition, the IF signal 3 is mixed in a second channel, for example the I signal generation channel, in the synchronous detector 13 with the oscillator signal 10 which has been shifted by 90° in phase by a conventional phase shifter 17. Synchronous detector 13 produces I signal components 18 of the difference frequency signal which is representative of the doppler frequency shift of moving objects and having a second phase relationship to the oscillator signal 10 which is shifted approximately 90° from the first phase relationship of the Q signal 16. The analog I and Q signals, 18 and 16, are digitized by conventional baseband processor A/D converters 20 and 21, to produce digital I and Q signals 22 and 23, respectively.

Normally, in a radar system the digital I and Q signals, 22 and 23, of the baseband processor 2 are provided to the radar doppler processor 15 for further processing thereby. However, in the present embodiment, the signal flow of the digital I and Q signals, 22 and 23, is interrupted by the switch functions S2 and S3, respectively. The digital I signal 22 is coupled to the pole position 24 of switch S2 and the digital Q signal 23 is coupled to the pole position 25 of switch S3. When switch functions S2 and S3 are operated respectively in positions 26 and 27, the digital I and Q signals are conducted to a simple two-phase digital canceller circuit 28 for processing thereby. Switch functions S2 and S3 are operated in positions 26 and 27, usually in concurrence with S1 being operated in position 5, by the conventional timing circuit 12 preferably during the dead time between radar pulse transmissions. Accordingly, switch functions S2 and S3 are operated in positions 30 and 31 in concurrence with S1 being operated in position 4 to permit normal doppler processing, for example, of the incoming IF signal 3 by the MTI radar doppler processor 15. The timed operation of the switches S1, S2 and S3 permits the pilot signal 6 to be conducted through the I and Q signal generation channels of the baseband processor 2, for some period of time preferably during pulse transmission dead times of the radar receiver, for purposes of determining and correcting any unbalance in the I and Q channels using the automatic phase and gain balance controller 1 as will be described in greater detail hereinbelow.

The two-pulse canceller circuit 28 is provided for purposes of countering the effects of any carrier leakage which may be present in the pilot signal 6 and to remove the DC offsets in the A/D converter outputs generally caused by the A/D conversion process. The I and Q outputs of the two-pulse digital canceller 28 are coupled to two filters 33 and 35 which may be of the finite impulse response (FIR), one of which passes the modulation frequency component of the pilot signal 6 and nulls out any image frequency component, while the other filter passes the image frequency component but nulls out the modulation frequency component. In their simplest form and suitable for the purposes of this embodiment, these FIR filters 33 and 35 may have complex impulse responses of $(1, j)$ and $(1, -j)$, respectively. The features and other benefits of these filters 33 and 35 will become more apparent in a description of greater detail found herebelow.

The outputs of FIR filter 33 denoted as $b_I$ and $b_Q$, and the outputs of FIR filter 35 denoted as $c_I$ and $c_Q$, are processed in an arithmetic unit 37 to form the dot-product of the outputs of the two FIR filters 33 and 35 and, in addition, the dot-product of one filter output with that of the other after a 90° phase rotation (i.e. interchange of I and Q components). As will be more fully understood from the description found below, those dot-products form error sensing signals proportional to the amplitude and phase imbalance errors of the synchronous detectors 13 and 14 and A/D converters 20 and 21 of the I and Q signal generation channels.

A signal 39 representative of the amplitude error imbalance between I and Q channels is coupled to a feedback circuit 41, which may be of the feedback integrator type, to control the adjustment of an amplitude controller 42 which is coupled in a feedback arrangement to the A/D converter 20 disposed in the I signal generation channel. In addition, a signal 44 representative of the phase error imbalance between the I and Q channels is coupled to another feedback circuit 45 which may be of the feedback integrator type to control the adjustment of a conventional phase shift controller 47 which is also coupled in a feedback arrangement to the 90° phase shifter 17. The amplitude and phase errors are separately derived and isolated by the FIR filters 33 and 35 and arithmetic circuit 37. The two feedback servo control loops are substantially non-interactive and function to control the errors respectively associated therewith. The feedback circuits 41 and 45 are used in the present embodiment for purposes of ensuring the control of loop stability and may be provided with adjustments accordingly therefor. It is understood however, that controllers having more sophisticated feedback compensation functions than that of the feedback integrator type may be additionally used to stabilize loop instabilities resulting from any unusual circuit conditions which may exist without deviating from the generation of the invention.

An analysis of an imbalance condition in the I and Q signal generation channels of the baseband processor 2 which may be caused by phase and amplitude imbalances between the synchronous detectors 13 and 14 and A/D converters 20 and 21 is presented to provide a better understanding and appreciation of the present invention. Synchronous detectors and A/D coverters are conventionally used in the baseband processor 2, for example, to produce I and Q signals corresponding to sampled values of the I and Q components of the analog IF bandpass input signal 3. At any one sampling instant, the input signal 3 may be represented mathematically by the complex (or vector) quantity $$V_i = Ae^{j\phi} = A(\cos\phi + j\sin\phi) \qquad (1)$$

corresponding to its amplitude A and phase $\phi$ relative to the local frequency reference COHO 11.

In general, "ideal" synchronous detectors and A/D coverters generate $I_0$ and $Q_0$ channel outputs represented as real and imaginary components of $V_i$, namely $$I_0 = A\cos\phi \qquad (2)$$

$$Q_0 = A\sin\phi \qquad (3)$$

Equivalently, the $I_0$ and $Q_0$ components may be regarded as the dot-products of the vector $V_i$ and the orthonormal vectors $$i_0 = 1 + j0 \qquad (4)$$

$$q_0 = 0 + j \qquad (5)$$

Phase and amplitude imbalances resulting from "non-ideal" circuits may be taken into account mathematically by allowing $i$ and $q$ to depart from their orthonormality. Without loss of generality, the phase and amplitude imbalance may be singly referenced to the vector $i$ (or I channel) alone, such that now $i_0$ and $q_0$ are replaced by $$i = a(\cos\theta + j\sin\theta) \qquad (6)$$

$$q = 0 + j \qquad (7)$$

where $\theta$ is the phase error of the I channel and $\delta$ is its amplitude (or scaling) error, with $$a = 1 + \delta \qquad (8)$$

Figure 6:
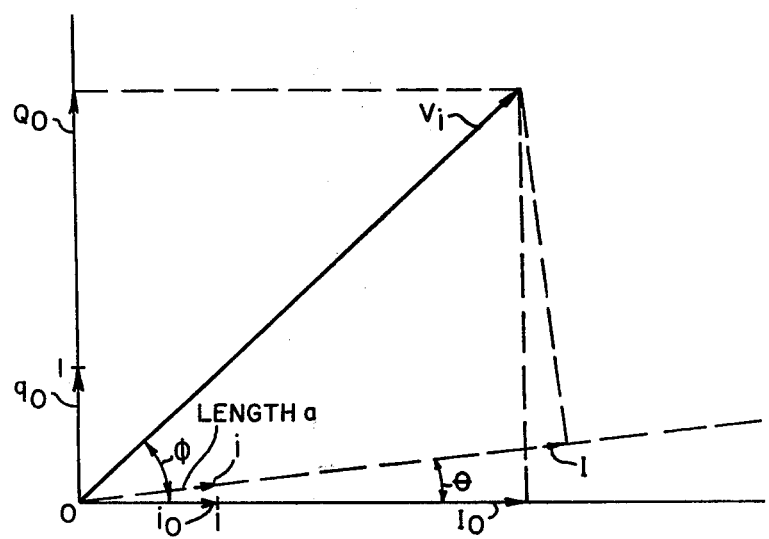
FIG. 6 is a graph which illustrates a frame of reference for measurement of composite in-phase and quadrature signals containing imbalance phase and amplitude errors denoted by $\theta$ and $a$.

This vector notation is graphically presented in FIG. 6 to provide a better understanding of the mathematics of equations (6) and (7) above. Correspondingly, the $I_0$ and $Q_0$ signals are replaced by $$I = aA\cos(\theta - \phi) \qquad (9)$$

$$Q = A\sin\phi \qquad (10)$$

or in the exponential form $$I = \frac{aA}{2}[e^{j(\theta - \phi)} + e^{-j(\theta - \phi)}] \qquad (11)$$

$$Q = \frac{jA}{2}[e^{j\phi} - e^{-j\phi}] \qquad (12)$$

From the foregoing, it can be shown mathematicaly that the resulting vector from the I and Q components will have two terms as shown below.

$$I + jQ = \underbrace{\frac{A}{2}(ae^{-j\theta} + 1)e^{j\phi}}_{\text{1st term}} + \underbrace{\frac{A}{2}(ae^{j\theta} - 1)e^{-j\phi}}_{\text{2nd term}} \qquad (13)$$

For the purposes of simplifying the mathematics, suppose that the input signal, $V_i$, is a constant amplitude sinusoid, such that A is a constant and $$\phi = \omega t \qquad (14)$$

Figure 1:
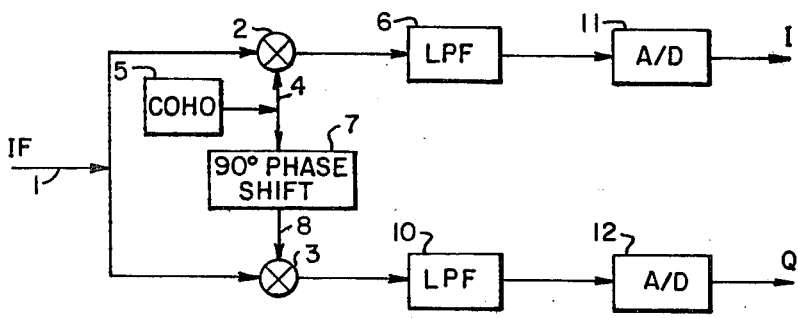
FIG. 1 is a block diagram schematic representative of the in-phase and quadrature signal generation channels of a baseband processor.
Figure 2A:
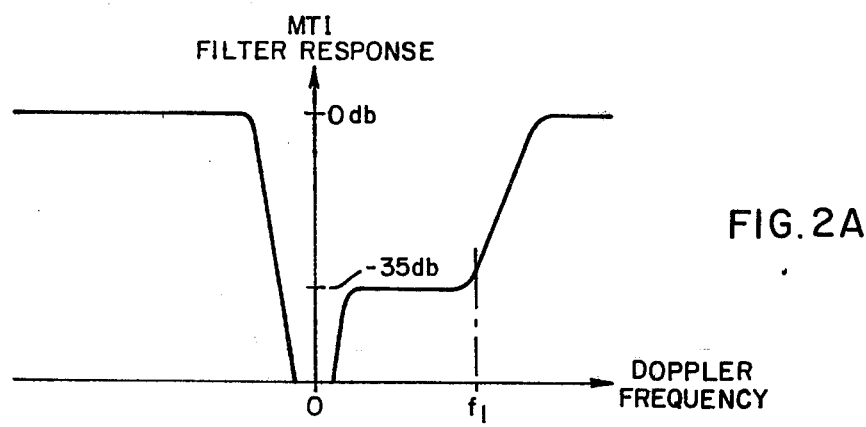
FIGS. 2A and 2B are graphs exhibiting typical unsymmetrical doppler response curves of a pair of ground and rain clutter canceller filters typically employed by moving target indicator radar systems.
Figure 2B:
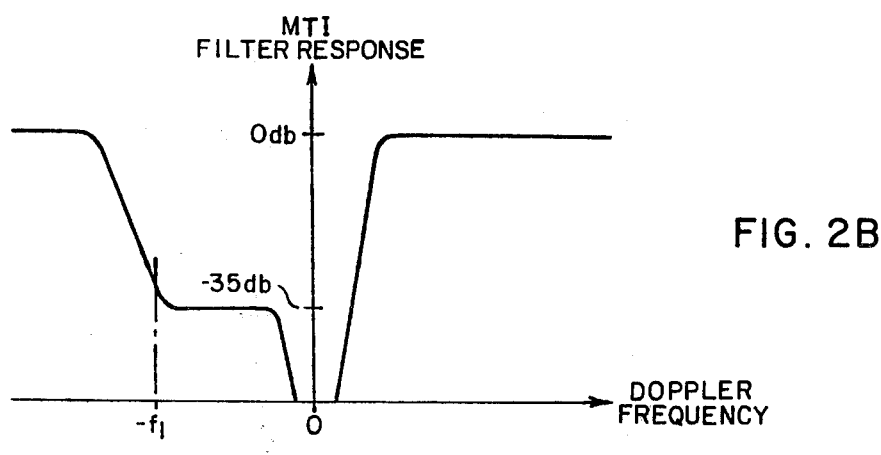
Figure 3:
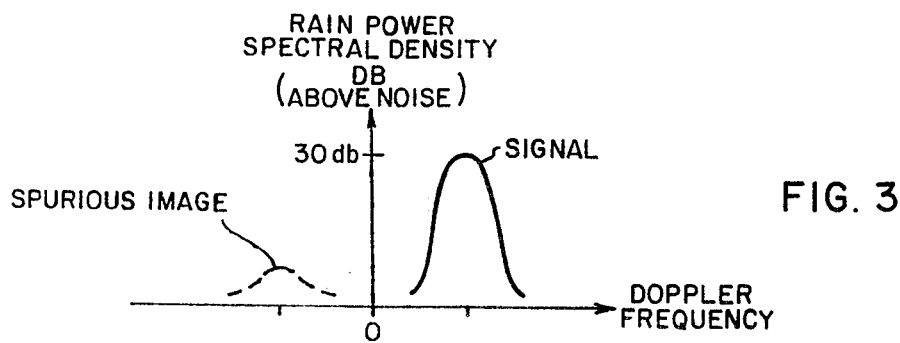
FIG. 3 is a graph of rain power spectral density illustrating spurious image frequency components resulting from imbalance between the in-phase and quadrature signal generation channels similar to those of FIG. 1.
Figure 4:
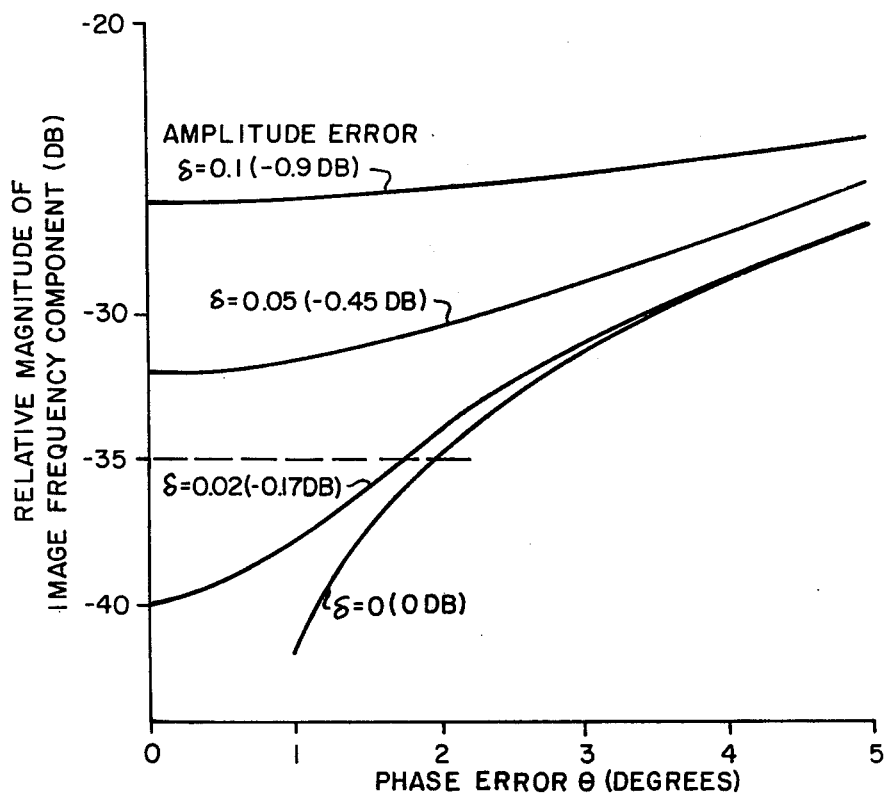
FIG. 4 is a graph exemplifying the relative magnitude of an image frequency component as a function of amplitude and phase imbalance errors between in-phase and quadrature signal generation channels of a typical baseband processor.

It is apparent, then, that the second term of equation (13) above represents an output signal error component at the image frequency $(-\omega)$, and the first term of equation (13) above indicates that the amplitude and phase of the original input signal as shown in equation (1) above is distorted by the complex multiplying factor $(ae^{-j\theta} + 1)/2$. Since $\delta$ and $\theta$ are expected to be normally small, this multiplying factor is expected to be close to unity. The second term in equation (13) above represents the error output which is usually of paramount importance, namely the imbalance error signal generated at the signal image frequency. This spurious image signal is illustrated in FIG. 3 in relation to the actual signal of rain clutter in the form of power spectral density. Examples of relative magnitude of the image signal are plotted in FIG. 4 for a typical baseband processor system.

The purpose, then, of the present embodiment is to sense and isolate the imbalance errors $\delta$ and $\theta$ and to adjust the amplitude and shift the phase corresponding to one of the channels of the I and Q signal generation channels to null the errors $\delta$ and $\theta$, thus substantially eliminating the second term of equation (13) above and affecting said first term more closely in relation to equation (1).

Figure 7:
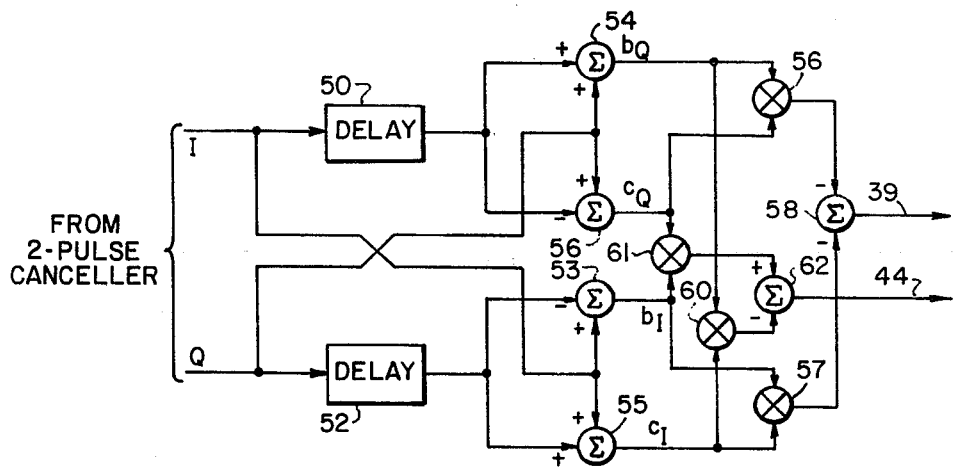
FIG. 7 is a block diagram schematic suitable for implementation of the filters 33 and 35 and the arithmetic circuits 37 of the embodiment of FIG. 5.

A more detailed functional block diagram schematic of an embodiment of the FIR filters 33 and 35 and the arithmetic circuits 37 which was found suitable to derive and isolate the imbalance phase and amplitude errors according to the preferred embodiment is provided in FIG. 7. Prior to describing the embodiment of FIG. 7, an analysis is presented in accordance with the operation of the block diagram schematic to yield a better understanding thereof. The $I + jQ$ terms of equation (13) may be rewritten as $$I + jQ = be^{j\phi} + ce^{-j\phi} \qquad (15)$$

where $$b = A[(a\cos\theta + 1) - ja\sin\theta]/2 \qquad (16)$$

$$c = A[(a\cos\theta - 1) + ja\sin\theta]/2 \qquad (17)$$

Consider the dot-product $(b\cdot c)$ of the vector $b$ and vector $c$, and also the dot-product $(b\cdot jc)$ of vector $b$ and vector $j\cdot c$, i.e. $c$ rotated through a positive angle of 90°. From equations (16) and (17):

$$b\cdot c = A^2(a^2\cos 2\theta - 1)/4 \qquad (18)$$

and $$b\cdot jc = -a^2 A^2 \sin 2\theta/4 \qquad (19)$$

Since $\delta$ and $\theta$ are generally very small in magnitude, the equations (18) and (19) may be approximated as follows:

$$b\cdot c \approx A^2[(1 + \delta)^2(1 - \theta^2) - 1]/4 \approx A^2\delta/2 \qquad (20)$$

$$b \cdot jc \approx -A^2(1+\delta)^2 2\theta/4 \approx A^2\theta/2 \quad (21)$$

Therefore, it is shown that the dot-products of equations (20) and (21) provide substantially separate amplitude ($\delta$) and phase ($\theta$) imbalance error signals, respectively. It will now be shown more specifically how $b$ and $c$ are obtained in digital form, so that $b \cdot c$ and $b \cdot jc$ are generated therefrom. As has been previously described, the pilot signal 6, for example $Ae^{j\phi(t)}$, is applied through switch function S1 to the synchronous detectors 13 and 14 and the A/D coverters 20 and 21 to generate the I and Q components which form the two terms mathematically shown in equation (13) above. The I and Q components containing the phase $\theta$ and amplitude $\delta$ imbalance errors are conducted through switches S2 and S3, respectively, to first a twophase canceller circuit 28 and then, to two FIR digital filters 33 and 35 of different characteristics such that the quantity $be^{j\phi(t)}$ appears at the output of filter 33 and $ce^{-j\phi(t)}$ appears at the output of filter 35. It is found that by sampling outputs of the filters 33 and 35 at times when the phases thereof are zero or $\pm\pi/2$ or $\pi$ with respect to the phase of the COHO reference signal 10, the magnitude of the vectors $b$ and $c$ or their values multiplied by $\pm j$ or $-1$ may then be derived.

The simplest choice of waveforms for the pilot signal 6 is a sinusoidal waveform input:

$$Ae^{j\phi(t)} = Ae^{j\frac{\pi}{2T}t} \quad (22)$$

where $A$ is a constant and $T$ is the predetermined time between successive samples taken at the filter outputs and which is also assumed a constant for the purposes of this embodiment. The filters 33 and 35 may be characterized by the impulse responses denoted by the Z-transforms $$h_{33}(Z) = 1 + jZ^{-1} \quad (23)$$

$$h_{35}(Z) = 1 - jZ^{-1} \quad (24)$$

The magnitude responses related to corresponding continuous transfer functions of equations (23) and (24) may be mathematically written as:

$$|H_{33}(j\omega)|^2 = |1 + je^{-j\omega T}|^2 = 2(1 + \sin \omega T) \quad (25)$$

$$|H_{35}(j\omega)|^2 = |1 - je^{-j\omega T}|^2 = 2(1 - \sin \omega T) \quad (26)$$

and further, the phase response corresponding to the continuous transfer functions of equations (23) and (24) may be represented as:

$$\phi_{33}(j\omega) = \tan^{-1}\left[\frac{\cos \omega T}{1 + \sin \omega T}\right] \quad (27)$$

$$\phi_{35}(j\omega) = \tan^{-1}\left[\frac{-\cos \omega T}{1 - \sin \omega T}\right] \quad (28)$$

Figure 8A:
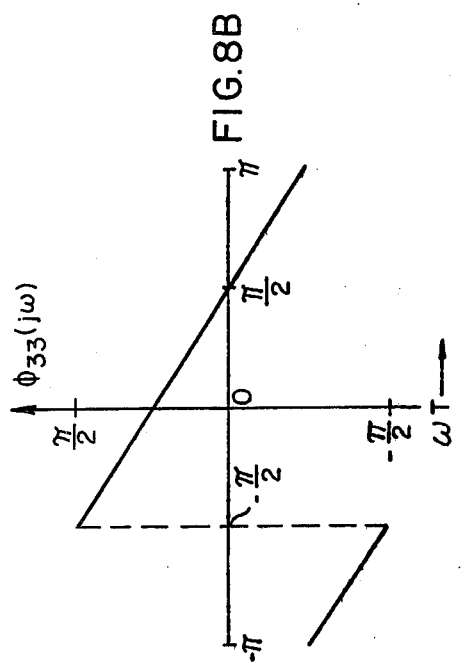
FIGS. 8A through 8D depict graphically suitable magnitude and phase response characteristics of the filters 33 and 35 of the embodiment shown in FIG. 5.
Figure 8B:
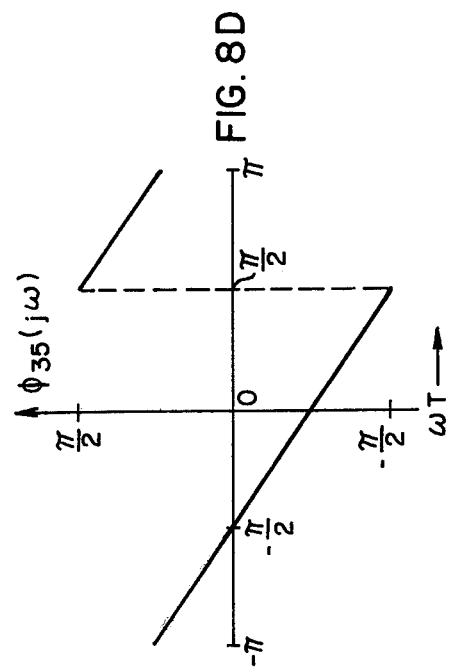
Figure 8C:
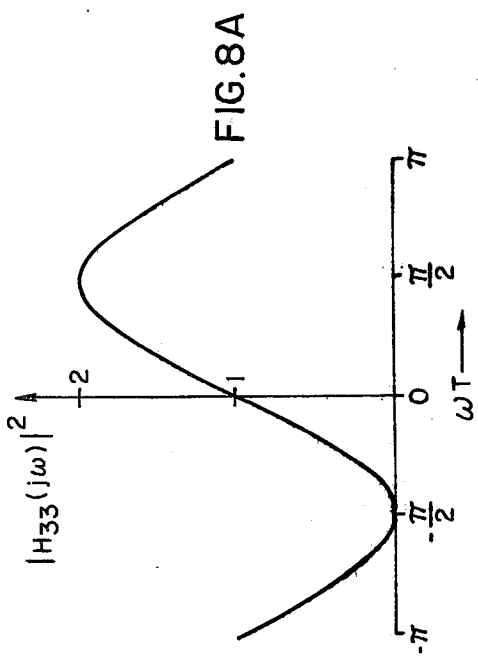
Figure 8D:
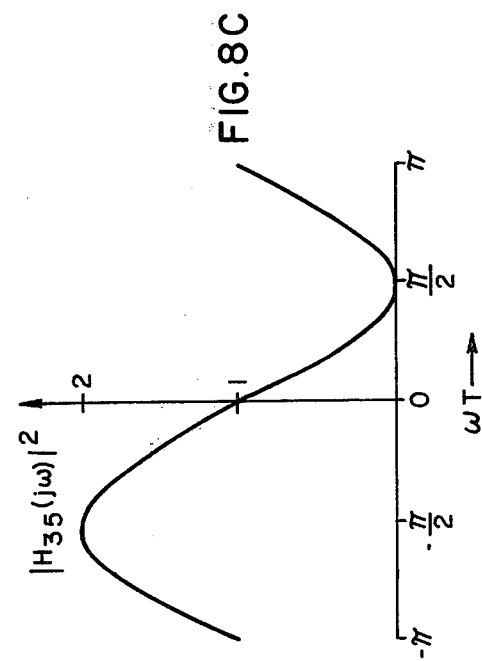

The magnitude and phase response relationships of the two digital filters 33 and 35 are exhibited in FIGS. 8A and 8D, and FIGS. 8C and 8D, respectively.

Since the choice of for the pilot signal 6 was determined to be $\pi/2T$ (refer to equation (22) above), the A/D converter outputs therefore will contain a component at this frequency and also, in general, as a result of any imbalance between I and Q channels, a component at the image frequency $$\omega - = -\pi/2T \quad (29)$$

It can be shown from the magnitude and phase response curves of FIGS. 8A and 8B, respectively, that digital filter 33 passes signals of frequency $\omega+$ with zero phase shift, but completely attenuates signals at $\omega-$. Conversely, filter 35 passes signals at frequency $\omega+$. Thus, for the selected value of $\omega$ for the pilot signal 6, the phase shifts of the filter outputs will be zero. Hence, by sampling the phase of the pilot signal correctly relative to the COHO reference frequency 10, as previously described hereinabove, at the predetermined sample times, the filter outputs on alternate pulses provide the magnitudes of vectors $b$ and $c$ from which the desired imbalance error signals $\delta$ and $\theta$ may be isolated.

Referring now to the embodiment shown in FIG. 7, the I and Q signals from the two-pulse canceller circuit 28 are coupled to conventional digital delay circuits 50 and 52, respectively. The output of the digital delay 52 is subtracted from the digital I signal using a typical digital summer function 53 to form an output denoted as $b_I$. In addition, the output of digital delay 50 is summed with the Q signal using a typical digital summer function 54 to form an output signal denoted as $b_Q$. This block schematic arrangement of functions described in connection with the formation of the components $b_I$ and $b_Q$ implement the function of the FIR digital filter 33 having the response characteristics shown in FIGS. 8A and 8B. The signals $b_I$ and $b_Q$ are representative of the real and imaginary components of the vector $b$ as mathematically represented in equations (15) and (16). Accordingly, the output of the digital delay 52 is summed with the I signal using a typical digital summer 55 to form an output signal denoted as $c_I$ and, likewise, the output of the digital delay 50 is subtracted from the Q signal in a typical digital summer 56 producing a signal denoted as $c_Q$. This block schematic arrangement of functions described in connection with the formation of signals $c_I$ and $c_Q$ implement the function of the FIR digital filter 35 having the response characteristics shown in FIGS. 8C and 8D. The signals $c_I$ and $c_Q$ are representative of the real and imaginary components of the vector $c$ as mathematically represented in equations (15) and (17).

The remaining portions of the schematic of FIG. 7 constitute the arithmetic circuits used to separately derive the amplitude ($\delta$) and phase ($\theta$) errors. The signals $b_Q$ and $c_Q$ are multiplied together in a typical digital multiplier 56 to form the product $b_Q c_Q$ and the signals $b_I$ and $c_I$ are multiplied together in a typical digital multiplier 57 to form the product $b_I c_I$. Both of the products $b_Q c_Q$ and $b_I c_I$ are negatively scaled and algebraically added together in a conventional digital summing function 58 to form a signal 39 proportional to the amplitude error which is represented mathematically in equation (20). The cross-products $b_Q c_I$ and $b_I c_Q$ are likewise formed using typical digital multiplier functions 60 and 61, respectively. The cross-product $b_Q c_I$ is negatively scaled and algebraically added to the cross-product $b_I c_Q$ in a typical summer 62 to yield a signal 44 proportional of the phase error ($\theta$) represented by the equation (21) above. A value T is suitably chosen as the delay time of the digital delays 50 and 52 for this embodiment and additionally, the delays 50 and 52 may be synchronized to the operations of the synchronous detectors 13 and 14 and A/D converters 20 and 21 shown in FIG. 5 to enhance the rejection of any spurious noise resulting from the periodic digital switching operations of a baseband processor utilized in a conventional coherent radar receiver employing doppler processing as referenced in U.S. Pat. No. 3,797,016 and U.S. patent application Ser. No. 792,279, in connection with the preferred embodiment.

Figure 9:
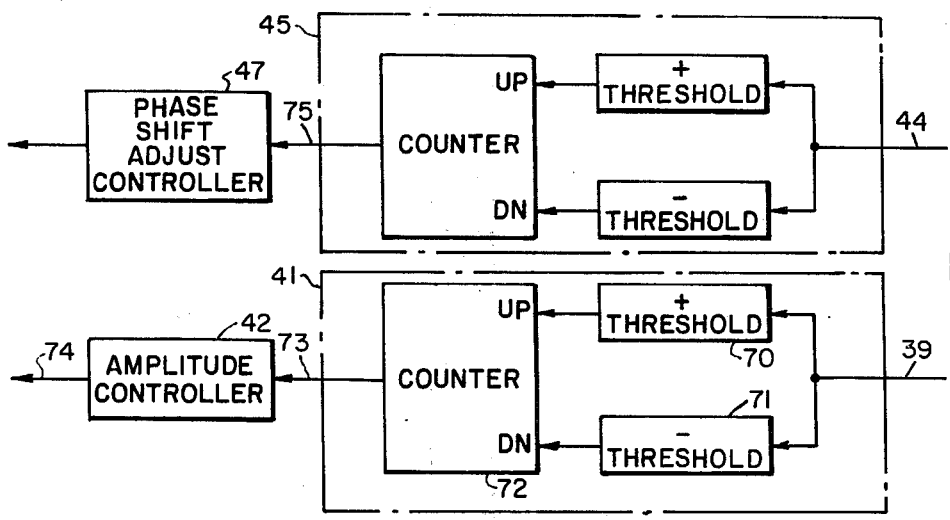
FIG. 9 is a block diagram schematic depicting a practical embodiment of the feedback circuits of FIG. 5.

A suitable embodiment for the feedback circuits depicted in FIG. 5 is described below in connection with the block diagram schematic of FIG. 9. Referring to FIG. 9, the amplitude error signal 39 is coupled to two threshold detector circuits 70 and 71 within the feedback integrator circuit 41. These detectors 70 and 71 provide quantized outputs, whenever the sensed error signal 39 exceeds either positive or negative threshold setting. These quantized outputs may be used to drive an up/down counter 72 which may provide a digital input control 73 to the amplitude controller. The amplitude controller may be a D/A converter with its output connected in series with a constant A/D reference source, thus amplitude control may be accomplished by adjustment of the reference voltage of the A/D converter 20 in the I channel as shown in FIG. 5. The feedback integrator 45 functions similarly to the integrator 41. The digital up/down counter output 75 generated thereby may be connected to a digital phase adjustment controller 47 which is operative in response to the digital signal 75 to alter the phase shift affected by the phase shifter 17 in order to bring the phase error back within the band determined by the threshold setting.

It is understood that in order to provide loop stability to the feedback control circuits of 41, 45, 42 and 47, the gain scaling must be sufficiently fine such that the sensitivity in output as a result of a counter increment (or decrement) is less than that required to drive the corresponding value of error signal from the positive to negative thresholds, or vice versa. It is understood that the feedback circuit of FIG. 9 is but one of many which may be envisioned for the purpose of implementing this function, and that other similar embodiments could be employed without deviating from the principles of the invention. For example, a digitally controlled IF modulator may be used at the I (or Q) channel A/D converter input for controlling the amplitude of the signal 18 (or 16). Also, another digitally controlled modulator may be disposed at the I (or Q) channel synchronous detector reference oscillator input to inject a small increment of the Q (or I) channel reference to control the phase shift. In all cases, the digital controls offered by the feedback integrators 41 and 45 may be maintained during normal processing of the IF modulated input signal 3 using the baseband processor 2 to retain balance of the I and Q signal generation channels thereof.

Figure 10:
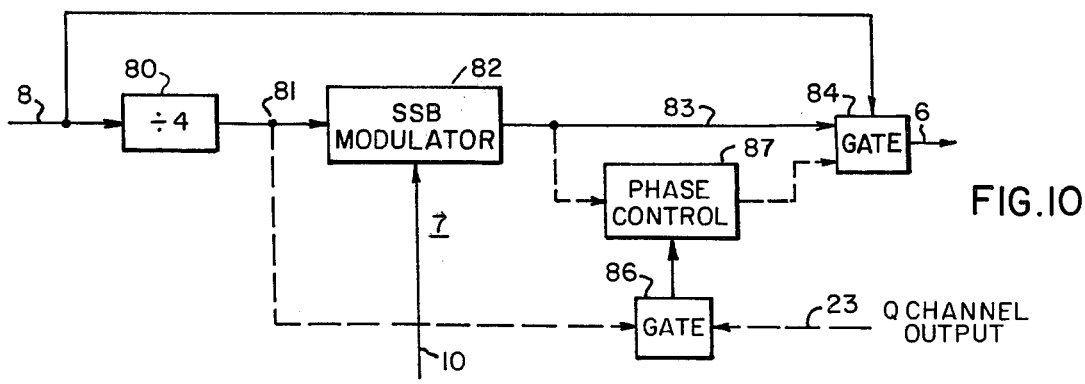
FIG. 10 is a block diagram schematic of a pilot signal generator suitable for use in the embodiment of FIG. 5.

A block diagram depicting the pilot signal generator 7 of FIG. 5 in greater detail is shown in FIG. 10. The pilot signal generator 7 is employed primarily for generating a pilot signal 6 which is used preferably during radar receiver dead time to excite the error sensing circuits 33, 35, and 37 typically with fixed pulse repetition frequency (prf) pulses. The pilot clock signal 8, typically having a pulse repetition frequency (prf) of 1 KHz, is typically divided in frequency by a factor of 4 by a conventional divide-by-4 circuit 80 to provide a signal 81 having an offset frequency of exactly ¼ the pilot clock signal prf, or about 250 Hz. The signal 81 modulates the COHO reference frequency signal 10 in a conventional single sideband (SSB) modulator 82. The output signal 83 of the modulator 82 is synchronously gated by the pilot clock signal 8 using a conventional digital gate signal 84 to produce the pilot signal 6. This pilot signal 6 is of a constant amplitude and pulse modulated at the radar pulse-width, approximately 0.5 sec. pulsewidth (or compressed pulsewidth in a phase-coded radar, for example) so that the synchronous detectors are excited over their normal operating bandwidth.

It is preferred that the pilot signal 6 be pulsed at a constant prf to permit proper operation of the error sensing circuits 33, 35 and 37 (refer to FIG. 5). In the case of Variable Interpulse Period (VIP) radars wherein it may be desired to use only one pilot signal pulse for each transmitted pulse of the radar or integer multiple thereof, it may be required that the pilot signal prf be a submultiple of the average radar prf depending on the specific VIP sequence employed.

The pilot signal 6 generated by the circuitry just described is assumed to be precise in-phase, relative to the COHO reference signal 10 at the A/D converter sampling times. In the exceptional case in which a phase error $\epsilon$ may be present in the pilot signal 6, the outputs of the filters 33 and 35 at their predetermined sample times become, respectively $$b' = be^{j\epsilon} \tag{30}$$

$$c' = ce^{j\epsilon} \tag{31}$$

Further, it can be shown mathematically that $$b' \cdot c' = \frac{A^2}{4} \{\cos 2\epsilon \ (a^2 \cos 2\theta - 1) + a^2 \sin 2\theta \sin 2\epsilon\} \tag{32}$$

and $$b' \cdot jc' = \{\sin 2\epsilon \ (a^2 \cos 2\theta - 1) - a^2 \sin 2\theta \cos 2\epsilon\} \tag{33}$$

In general, therefore, a non-zero value for $\epsilon$ results in cross-coupling between the phase and amplitude imbalance sensing circuits. However, if $\epsilon$ is small, as also $\theta$ and $\delta$ are normally, the following approximations may apply $$b' \cdot c' \approx \frac{A^2}{4} [(1 - \delta)^2 (1 - 2\theta^2) - 1 + 4\theta\epsilon] \approx \frac{A^2}{4} (\delta + 2\theta\epsilon) \tag{34}$$

$$b' \cdot jc \approx \frac{A^2}{4} \{2 [(1 - \delta)^2 (1 - 2\theta^2) - 1] - 2\theta\} \approx -\frac{A^2}{4} (\theta + 2\delta\epsilon) \tag{35}$$

The extent of the cross-coupling as exhibited by above equations (34) and (35) is thus seen to be proportional to $\epsilon$. In practice, modest degrees of cross-coupling would be permissible so that the phase control of the pilot signal 6 need not be very precise. However, if desired, feedback control of the pilot signal phase may be accomplished as shown by the dotted signal paths of FIG. 10. This optional phase control circuitry operates to sense the Q channel output signal 23 once each cycle of the signal 81 using a conventional gate function 86. The Q channel output signal 23 is sampled by gate 86 at times when said output should be zero. A typical phase control circuit 87 makes use of any difference of the signal 23 from zero occurring at the sampling times to provide phase control to the signal sideband modulated signal 83. The embodiment shown employs the A/D converter Q channel digital output 23 in which case the use of a conventional digital phase control circuit 87 is required. However, an alternative signal path may be implemented in analog form using the synchronous detector Q channel analog output signal 16 in which case an analog phase control circuit 87 is required.

In the generation of the required pilot signal 6 by single sideband modulation of the COHO reference signal 10, it is important that the unwanted image sideband usually resulting from a modulation generation be adequately suppressed and that all carrier (COHO) frequency signal components also be effectively eliminated. An image sideband, if present, may appear as a spurious synchronous detector or A/D converter unbalance. The same may also be true of carrier frequency leakage which is equivalent in effect to synchronous detector or A/D converter DC offset and would likely appear at the outputs at the outputs of the filters 33 and 35.

Image sideband suppression must be accomplished in the single sideband generation process of the single sideband modulator 82 as shown in FIG. 10. It could be achieved, for example, by AM modulation at the desired offset frequency, say 250 Hz, locked to the COHO reference frequency (e.g. approximately 1 MHz) followed by the crystal filtering to remove the unwanted sideband, and subsequent up-conversion to the required COHO frequency. Another method may be to employ a phase lock loop to control a VCO to generate the desired frequency offset from that of the COHO 11.

Carrier frequency leakage need not be precisely controlled in the pilot signal generator 7 since its effects can be eliminated by the simple digital two-phase canceller circuits 28 at the A/D converter outputs, in the I and Q channels, ahead of the filters 33 and 35, as shown in FIG. 5. The canceller circuits effectively eliminate any DC components in the inputs of filters 33 and 35, from whatever source (e.g. the A/D converter zero drift). The following analysis shows that the canceller filters also introduce a relative phase shift of 90° between the pilot and image frequencies at their outputs. Since this phase shift is merely equivalent to an interchange of $b \cdot c$ and $b \cdot jc$ it does not affect the controller's ability to generate the required phase and amplitude imbalance error signals 39 and 44.

The impulse response of a two-pulse canceller may be characterized by the Z-transform $$h(Z) = 1 - Z^{-1} \tag{36}$$

The corresponding frequency response is $$H(j\omega) = 1 - \cos \omega T + j \sin \omega T \tag{37}$$

and the phase response is $$\phi(\omega) = \tan^{-1}\left[\frac{\sin \omega T}{1 - \cos \omega T}\right] \tag{38}$$

Thus, at the pilot frequency, $\omega + = \pi/2T$ $$\phi\left(\frac{\pi}{2T}\right) = \tan^{-1}\left[\frac{1}{1}\right] = 45° \tag{39}$$

and at the image frequency, $\omega - = -\pi/2T$ $$\phi\left(\frac{-\pi}{2T}\right) = \tan^{-1}\left[\frac{-1}{1}\right] = -45° \tag{40}$$

Hence, $$\phi\left(\frac{\pi}{2T}\right) - \phi\left(\frac{-\pi}{2T}\right) = 90°. \tag{41}$$

With the incorporation of the two-pulse digital canceller 28, the error sensing circuits employ two sets of cascaded digital filters for the I and Q signals which require at least three input pulses of the pilot signal 6 at substantially fixed prf in order to provide valid output error signals, representative of $\delta$ and $\theta$. One convenient way of controlling the operation of the automatic phase and gain balance controller 1 shown in FIG. 5 is in a three-pulse batch process mode, such that no change in control settings may be made during the three-pulse processing interval of each batch. Subsequent to each three-pulse batch, a phase or amplitude control change may be made prior to the processing of the next three-pulse batch. It is clear that there may be an arbitrary time delay between batches and advantage may be taken of this in a VIP radar application to fit the three three-pulse batches into convenient portions of the VIP sequence, for example, such that the pilot signal modulation frequency is as high as possible. These aspects may ease the case in which the SSB COHO modulation signal is generated with a low amplitude image frequency component content. In extending this concept, it may be possible to develop the three pulses required for complete processing by the digital cascaded filters of the sensing circuits in rapid succession during a single radar dead period, thereby further increasing the pilot signal modulation frequency thus making the pilot signal still easier to generate which is particularly attractive in low prf VIP radar systems.

In general, the expected drift rates of phase and amplitude balance in the phase detector and A/D converter circuits will be very small, so that the loop bandwidths of the associated control circuits can be correspondingly low. As a result, the repetition rate of the three-pulse pilot signal batches can also be low. For example, a repetition rate of once per VIP sequence would certainly be completely adequate. There would not appear to be any circuit advantage in going to batch rates below this value, however, the possibility does exist.

While the invention has been described in connection with a radar system embodiment, it is understood that the invention may also be utilized in any system employing the baseband processor as depicted herein without deviating from the principles and broad scope thereof.

I claim:
1. An automatic gain and phase balance controller for nulling phase and amplitude imbalance which may be present between the in-phase and quadrature signal generation channels of a baseband processor, said controller comprising:
   means for generating a pilot signal;

means for conducting said pilot signal to said in-phase and quadrature signal generation channels of said baseband processor, said channels being governed by said pilot signal to generate composite in-phase and quadrature signals including phase and amplitude error signals representative of the imbalance between said in-phase and quadrature signal generation channels;

means for sensing and isolating said phase and amplitude error signals from said composite in-phase and quadrature signals; and feedback circuit means governed by said isolated amplitude and phase error signals to correct for the imbalance between the in-phase and quadrature channels by adjusting amplitude and phase parameters associated with the signal generation of said channels.

2. The controller as recited in claim 1 wherein the said phase and amplitude imbalance error signals are isolated from the composite in-phase and quadrature signals substantially independent and separate of each other.

3. The controller as recited in claim 2 wherein the feedback circuit means include two substantially non-interactive servo controllers, said one servo controller being governed by the separately isolated phase imbalance error signal to independently adjust for a correction in the phase unbalance between the in-phase and quadrature channels and said other servo controller being governed by the separately isolated amplitude imbalance error signal to independently adjust for a correction in the amplitude imbalance between the in-phase and quadrature channels.

4. The controller as recited in claim 1 wherein the baseband processor is incorporated in a radar system which transmits signal pulses spaced apart by periods of time in each of which is included a dead time during which the radar system is essentially unresponsive to echo signals received from detected objects; and wherein the pilot signal is conducted to the in-phase and quadrature signal generation channels of the baseband processor only during said dead times.

5. The controller as recited in claim 4 wherein said sensing and isolating means is operative only in concurrence with the conduction of the pilot signal to the in-phase and quadrature signal generation channels.

6. The controller as recited in claim 1 wherein the composite in-phase and quadrature signals generated from the pilot signal include both modulation frequency signal components and image frequency signal components, said image frequency signal components being generated primarily as a result of the imbalance between the in-phase and quadrature signal generation channels.

7. The controller as recited in claim 6 wherein:

the error sensing and isolation means includes two filters each responsive to the composite in-phase and quadrature signals generated from the pilot signal, one filter being operative to pass the modulation frequency signal components of the composite in-phase and quadrature pilot signal components and to null the image frequency signal components thereof and the other filter being operative to pass the image frequency signal components of the composite in-phase and quadrature pilot signal components and to null the modulation frequency signal components thereof;

the error sensing and isolation means further includes an arithmetic circuit means for generating a first signal representative of the dot-product of the outputs of the two filters and a second signal representative of the dot-product of one filter output with that of the other filter output which has been effected by a 90° phase rotation, said first and second signals being substantially representative of the phase and amplitude imbalance errors, respectively; and the respective association of the first and second signals with the phase and amplitude imbalance errors is dependent on the amount of phase shift introduced in the performance of the sensing and isolating means.

8. A radar system which transmits radar signal pulses spaced apart by periods of time within which radar echo signals are received for processing thereby, said radar system employing a baseband processor comprised of two mixer channels for generating analog in-phase and quadrature signal components of the in-coming radar echo signals with respect to the phase of a master oscillator signal, said in-phase and quadrature signals being representative of modulation frequency components of the radar echo signals, said one channel mixing the in-coming signal with a signal derived from the master oscillator signal and in phase therewith and said other channel mixing the in-coming signal with a signal derived from the master oscillator and shifted by 90° with respect thereto using a phase shifter, said mixer channels becoming phase and amplitude unbalanced in adjustment in the course of performance thereof causing imbalance phase and amplitude errors which render spurious image frequency components which are representative of false radar echo signals, said radar system comprising:

a pilot signal generator governed by a signal derived from the master oscillator signal and a pilot clock signal to generate a pilot signal;

a switching means operative to conduct one of the in-coming radar echo signal and the pilot signal to the mixer channels;

means for sensing and isolating the phase and amplitude imbalance errors from the in-phase and quadrature signal components generated from the pilot signal;

feedback circuit means governed by said isolated phase and amplitude imbalance errors to correct for the unbalance in phase and amplitude adjustment between the mixer channels, thereby substantially eliminating the spurious image frequency components which are representative of false radar echo signals.

9. The radar system as recited in claim 8 wherein the imbalance error sensing and isolation means is operative only in concurrence with the pilot signal being conducted to the mixer channels by the first switching means.

10. The radar system as recited in claim 8 wherein there exists a dead time in each of the interpulse transmission periods during which the radar mixer channels are not instrumentally adjusted to respond to the in-coming radar echo signals; and wherein the switching means conducts the pilot signal to the mixer channels only within said dead times.

11. The radar system as recited in claim 8 wherein:

the error sensing and isolation means includes two filters each responsive to the composite in-phase and quadrature signals generated from the pilot signal, one filter being operative to pass the modulation frequency signal components of the in-phase and quadrature pilot signal components and to null the image frequency signal components thereof and the other filter being operative to pass the image frequency signal components of the in-phase and quadrature pilot signal components and to null the modulation frequency signal components thereof;

the error sensing and isolation means further includes an arithmetic circuit means for generating a first signal representative of the dot-product of the outputs of the two filters and a second signal representative of the dot-product of one filter output with that of the other filter output which has been effected by a 90° phase rotation, said first and second signals being substantially representative of the phase and amplitude imbalance errors, respectively; and the respective association of the first and second signals with the phase and amplitude imbalance errors is dependent on the amount of phase shift introduced in the performance of the sensing and isolating means.

12. The radar system as recited in claim 11 wherein the amplitude and phase response of one of the two filters may be characterized by the following respective mathematical relationships:

$$|H(j\omega)|^2 = 2(1 + \sin \omega T)$$

and $$\phi(j\omega) = \tan^{-1}(\cos \omega T/(1 + \sin \omega T))$$

where $T$ is a predetermined response time of the one filter.

13. The radar system as recited in claim 12 wherein the amplitude and phase response of the other of the two filters may be characterized by the following respective mathematical relationships:

$$|H(j\omega)|^2 = 2(1 - \sin \omega T)$$

and $$\phi(j\omega) = \tan^{-1}(-\cos \omega T/(1 - \sin \omega T))$$

where $T$ is a predetermined response time of the other filter.

14. The radar system as recited in claim 13 wherein the pilot signal is comprised of the single sideband modulation of the master oscillator signal with a sinusoidal waveform having a predetermined frequency derived from the pilot clock signal, said sinusoidal modulation waveform having a constant amplitude.

15. The radar system as recited in claim 14 wherein the pilot signal is conducted to the mixer channels in accordance with predetermined modulated pulsewidths.

16. The radar system as recited in claim 14 wherein the frequency of the sinusoidal modulation waveform is predetermined in relation to the predetermined response times of the two filters.

17. The radar system as recited in claim 11 wherein the feedback circuits include two substantially non-interactive servo controllers, one servo controller being governed by the phase imbalance error signal to independently correct for the imbalance in phase between the mixer channels and the other servo controller being governed by the amplitude imbalance error signals to independently correct for the imbalance in amplitude between the mixer channels.

18. The radar system as recited in claim 17 wherein the two servo controllers are of the feedback integrator type.

19. The radar system as recited in claim 17 wherein the mixer channels each include an analog-to-digital converter for digitizing the in-phase and quadrature signal components generated thereby; wherein the servo controller governed by the phase imbalance error signal adjusts the phase shift of the phase shifter of the one mixer channel to correct the imbalance in phase between the mixer channels; and wherein the servo controller governed by the amplitude imbalance error signal adjusts the amplitude of a reference signal associated with the analog-to-digital converter of one of the mixer channels to correct the unbalance in amplitude between the mixer channels.

20. The radar system as recited in claim 19 wherein the two filters are of the digital finite impulse response type, said one filter may be characterized by the Z-transform as follows:

$$h(Z) = 1 + jZ^{-1}$$

and said other filter may be characterized by the Z-transform as follows:

$$h(Z) = 1 - jZ^{-1}.$$

21. The radar system as recited in claim 20 where the two digital filters of the error sensing and isolation means are preceded by a pair of two-pulse digital canceller filters for countering any carrier frequency leakage component which may be present in the pilot signal and for removing any DC offsets resulting from the A/D conversions.

22. The radar system as recited in claim 8 wherein the pilot signal is generated by modulating the signal derived from the master oscillator with a waveform having a predetermined frequency derived from the pilot clock signal; wherein the pilot signal generator includes a phase controller governed by the quadrature signal component generated from the pilot signal and a signal derived from the pilot clock signal to control the phase of the modulated waveform envelop of the pilot signal.

* * * * *